(12) United States Patent
Nugent

(10) Patent No.: US 7,250,603 B1
(45) Date of Patent: Jul. 31, 2007

(54) CRAWLING HANDLE FOR THERMAL IMAGING CAMERA

(75) Inventor: Timothy Nugent, Newport Beach, CA (US)

(73) Assignee: Draeger Safety, Inc., Pittsburgh, PA (US)

( * ) Notice: Subject to any disclaimer, the term of this patent is extended or adjusted under 35 U.S.C. 154(b) by 0 days.

(21) Appl. No.: 11/388,801

(22) Filed: Mar. 24, 2006

(51) Int. Cl.
*H01L 31/00* (2006.01)

(52) U.S. Cl. ........................................... 250/330

(58) Field of Classification Search ................ 250/330, 250/331, 332, 333, 334, 339.14
See application file for complete search history.

(56) References Cited

U.S. PATENT DOCUMENTS

| | | | |
|---|---|---|---|
| 3,017,513 | A | 1/1962 | Messelt |
| 3,489,008 | A | 1/1970 | Thornton et al. |
| 3,752,983 | A | 8/1973 | Yanez |
| 5,422,484 | A | 6/1995 | Brogi et al. |
| 5,485,237 | A | 1/1996 | Adermann et al. |
| 5,732,302 | A | 3/1998 | Yokota |
| 5,907,721 | A | 5/1999 | Schelling et al. |
| D424,081 | S | 5/2000 | Gordon |
| 6,115,559 | A | 9/2000 | Balling et al. |
| 6,144,031 | A | 11/2000 | Herring et al. |
| D464,666 | S | 10/2002 | Salapow |
| 6,486,473 | B2 | 11/2002 | Salapow et al. |
| D472,911 | S | 4/2003 | Bielefeld |
| D479,548 | S | 9/2003 | Bielefeld |
| D481,053 | S | 10/2003 | Colburn et al. |
| 6,649,912 | B2 * | 11/2003 | Salapow et al. ............ 250/330 |
| D483,782 | S * | 12/2003 | Lannestedt et al. ........ D16/202 |
| 6,787,775 | B1 | 9/2004 | Bielefeld et al. |
| 6,789,924 | B2 * | 9/2004 | Yuen .......................... 362/399 |
| 6,859,327 | B2 | 2/2005 | Del Bianco et al. |
| 2001/0046385 | A1 | 11/2001 | Salapow et al. |

(Continued)

FOREIGN PATENT DOCUMENTS

EP 0 458 925 B1 9/1998

(Continued)

OTHER PUBLICATIONS

Tyco Scott Health & Safety, "Eagle Imager 160", Bid Specifications, article, Jun. 2003.

(Continued)

*Primary Examiner*—David Porta
*Assistant Examiner*—David S Baker
(74) *Attorney, Agent, or Firm*—Caesar, Rivise, Bernstein, Cohen & Pokotilow, Ltd.

(57) ABSTRACT

A thermal imaging camera is provided that facilitates crawling by a user has a handle that supports the user's hand off of a floor and protects the camera. The handle includes a grip with a front bumper guard and a base having a widened portion at its butt end that has bumpers. Side bumpers at the opposite end of the handle extend outwardly from the sides of the handle which are coplanar with the bumpers at the butt end, to keep the handle generally parallel to the ground. The bumpers at the butt end and adjacent to the camera extend farther out than any other part of the handle or camera. The handle is removable and re-attachable to the camera. A removable handle alone for a portable, camera is also provided.

7 Claims, 5 Drawing Sheets

U.S. PATENT DOCUMENTS

| | | |
|---|---|---|
| 2002/0036902 A1* | 3/2002 | Lynch et al. ................. 362/166 |
| 2002/0162963 A1 | 11/2002 | Lannestedt et al. |
| 2002/0195562 A1 | 12/2002 | Salapow et al. |
| 2003/0122958 A1 | 7/2003 | Olita et al. |
| 2004/0050188 A1* | 3/2004 | Richards et al. ........... 73/866.3 |
| 2004/0124359 A1* | 7/2004 | Hamrelius et al. ....... 250/341.6 |
| 2005/0099803 A1* | 5/2005 | Krieger ...................... 362/183 |
| 2005/0219399 A1 | 10/2005 | Sato et al. |
| 2005/0229698 A1* | 10/2005 | Beecroft et al. .............. 73/300 |
| 2005/0252822 A1* | 11/2005 | Wu ............................ 206/573 |
| 2005/0270771 A1* | 12/2005 | Yuen ......................... 362/184 |
| 2006/0081777 A1* | 4/2006 | Bevan et al. ................ 250/330 |
| 2006/0091310 A1* | 5/2006 | Furry ......................... 250/330 |

FOREIGN PATENT DOCUMENTS

| | | |
|---|---|---|
| GB | 2 252 836 A | 8/1992 |
| JP | 2002-199258 | 7/2002 |
| JP | 2002-199385 | 7/2002 |
| JP | 2002-202188 | 7/2002 |
| JP | 2004173203 A * | 6/2004 |
| WO | WO 91/09389 | 6/1991 |
| WO | WO 01/65834 A2 | 9/2001 |
| WO | WO 2004/062273 A1 | 7/2004 |

OTHER PUBLICATIONS

ISG Theramal Systems, "Elite Tailsman", literature, website: www.isgfire.co.uk, (5 sheets).

FLIR Systems "Infrared Imaging Applied to Fire Fighting", literature, Mark J. Erickson, (13 sheets).

* cited by examiner

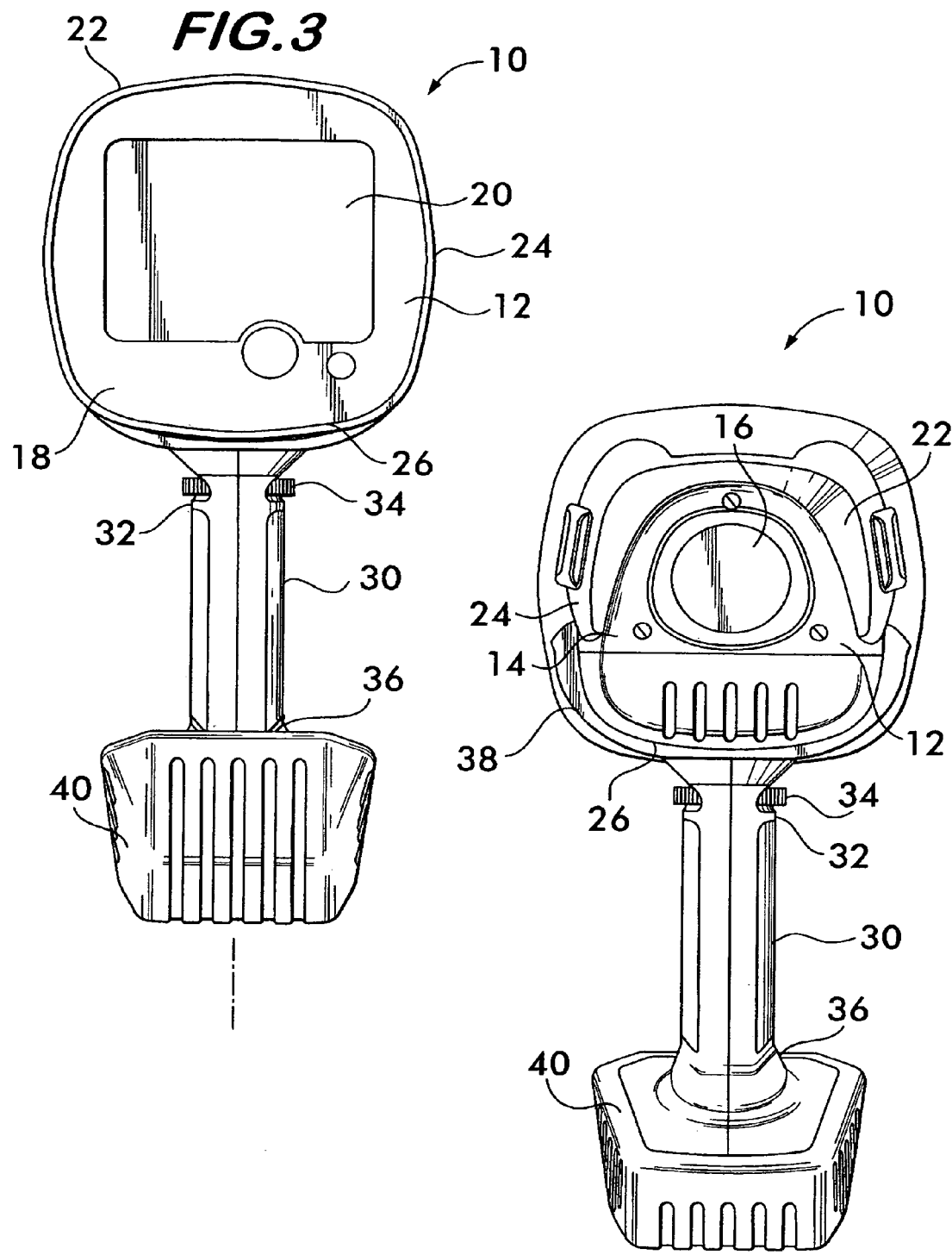

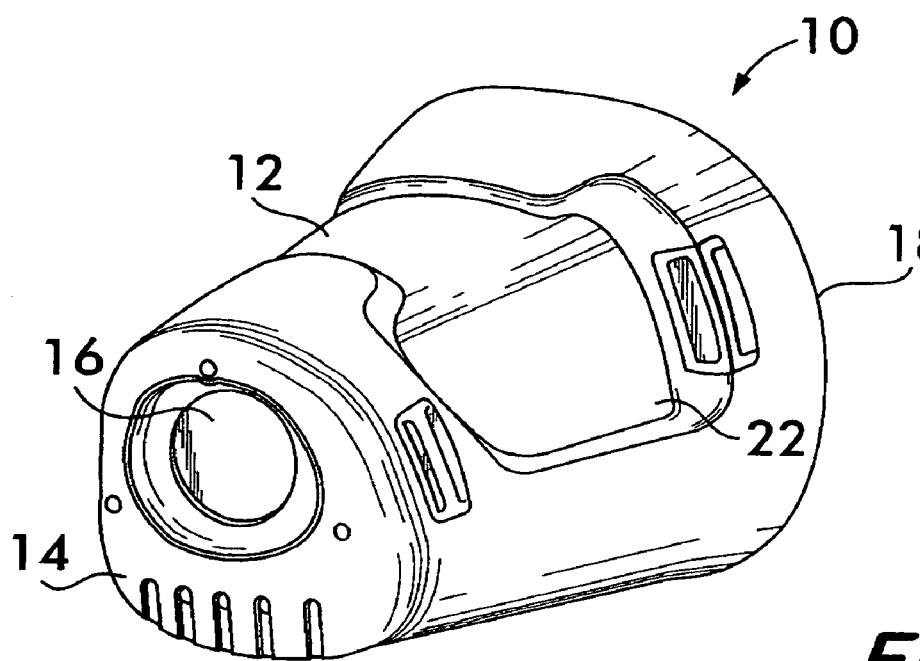
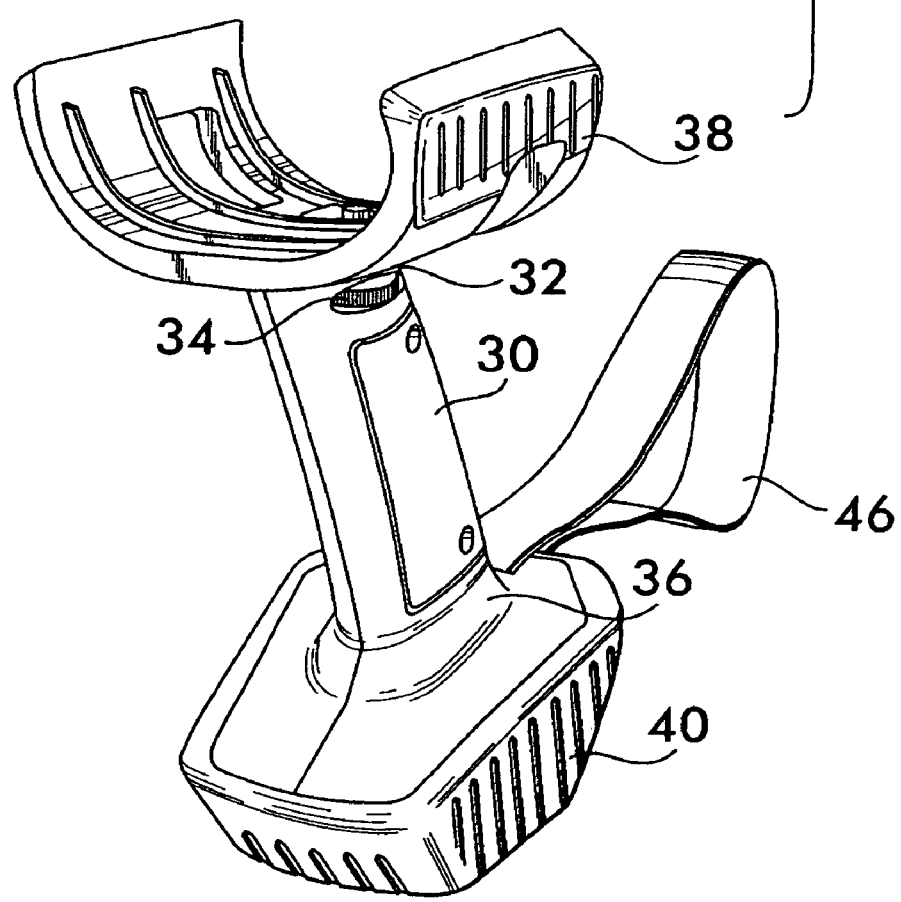
FIG. 6

CRAWLING HANDLE FOR THERMAL IMAGING CAMERA

BACKGROUND OF THE INVENTION

1. Field of the Invention

The present invention is directed to thermal imaging cameras and, more particularly, thermal imaging cameras suitable for use by a user who is crawling.

2. Background of the Invention

Thermal imaging cameras (TICs) are specialized cameras for use, for example, by firefighters, search and rescue workers, emergency workers, and the like, to view areas where there is heavy smoke, darkness or other areas where visibility is limited. A TIC is used, for example, to locate a seat of a fire, locate hot spots and size of an actual fire, find doorways and windows, locate trapped victims, etc.

The appearance and operation of TICs for firefighters and the like may be similar to a camcorder. Instead of CCD sensors which are commonly used in camcorders, most thermal imaging cameras use microbolometer arrays. The resolution of a TIC may be considerably lower than that of optical cameras. For example, the resolution of a TIC may be 160×120 or 320×240 pixels. Older bolometers required cryogenic cooling, usually requiring a miniature Stirling cycle refrigerator or liquid nitrogen.

Bolometers of the type for use with TICs for firefighters and the like typically use a grid of vanadium oxide or amorphous silicon heat sensors on a corresponding grid of silicon. Infrared radiation picked up by the TIC's lens hits the vanadium oxide grid and changes its electrical resistance. The TIC takes this resistance change and processes it into temperatures which are shown on the TIC's viewfinder. Bolometer grids are typically found in two array sizes: 320 by 240 or 160 by 120. Both sizes offer the same resolution. The 320 by 240 is capable of showing a larger field of view.

Bolometer technology of this type was originally developed in the 1980's in a classified contract for the U.S. Department of Defense. The US government de-classified the technology in 1992. After 1992, the technology spread to various manufacturers.

Numerous patents in the prior art teach the many different elements of TICs. For example, U.S. Pat. No. 6,649,912 (Salapow, et al.) is directed to a TIC having a seamless housing encompassing a TIC core. The TIC itself has bumpers at its edges but they do not extend out from the base of its handle to the same distance as that of those on the body of the TIC. The handle is not separable from the TIC itself. At column 7, the specification states that resilient bumpers cover all of the extremities or projecting portions of the camera such that if the camera is dropped at a flat surface, one of the resilient bumpers will always first contact the surface regardless of the orientation of the camera.

U.S. Pat. No. 6,787,775 (Bielefeld, et al.) is directed to a portable thermal imager with a shock-absorbing lens mount. The mount minimizes the transfer of impact forces to the lens. Although apparently not specifically discussed, the housing of this TIC does appear to have bumpers (as seen in FIG. 2). However, unpadded handles extend from the sides of this TIC further out than the bumpers.

U.S. Design Pat. No. 424,081 (Gordon) is directed to a hand held thermal imaging apparatus. Here, handles appear to extend from the housing of this TIC that are unpadded.

U.S. Design Pat. No. 472,911 (Bielefeld) is a design patent that is directed to a handle for the design of the '775 patent. While it is not clear, this handle appears to be a removable addition. Again, here, the butt end of the handle extends outwardly to form a base but this base does not extend as far out as the sides of the upper end of the handle adjacent to the TIC. Additionally, the side handles on the TIC here extend farther out than the upper end of the removable handle such that crawling with this camera is not suggested.

U.S. Design Pat. No. 479,548 (Bielefeld) is a design patent that is directed to what appears to be the same invention as that of the '775 patent, discussed above. Here, it can be seen that the handles extend out from the body of the TIC farther out than the bumpers as shown, for example, in FIG. 2.

U.S. Design Pat. No. 481,053 (Colburn, et al.) is a design patent directed to a TIC having a handle that is integral to the TIC. The base of the handle is of the same width as the top of the handle.

All references cited herein are incorporated herein by reference in their entireties.

BRIEF SUMMARY OF THE INVENTION

The present invention is directed to a TIC that facilitates a user crawling using the handle which supports the user's hand off of a floor upon which the user is crawling and protects the TIC from shock and vibration. The crawling handle includes a pistol grip with a front nose bumper guard and a base having a widened portion at its butt end that has bumpers. Side bumpers at the opposite end of the handle adjacent to the TIC extend outwardly from the sides of the handle which are coplanar with the bumpers at the butt end, to keep the handle generally parallel to the ground while keeping the user's hand off of the ground. When viewing this design from either the front (looking into the lens) or from the back (looking into the display), the bumpers at the butt end and adjacent to the TIC extend farther out than any other part of the handle or TIC. A strap extends off the back of the butt end of the handle. The handle is removable and re-attachable to the TIC by, for example, a threaded screw.

A removable handle for a portable, TIC is also provided wherein the handle has a longitudinal axis, a first end having a fastener for attachment to the TIC, the first end having at least one bumper extending perpendicularly outwardly from the longitudinal axis of the handle to a point beyond the side surface of the TIC, and a second end having at least one bumper thereon, extending perpendicularly outwardly from the longitudinal axis of the handle to a point generally the same perpendicular distance from the longitudinal axis as that of the bumper on the first end of the handle. When the handle is attached to a TIC, crawling by a user holding the camera by its handle using a hand is facilitated where the user's hand is supported off of a floor upon which the user is crawling and protects the TIC from shock and vibration. Preferably, the fastener is operable without the use of a separate tool. The fastener may be a thumb screw having a head that is manually operable by fingers of a user.

BRIEF DESCRIPTION OF SEVERAL VIEWS OF THE DRAWINGS

The invention will be described in conjunction with the following drawings in which like reference numerals designate like elements and wherein:

FIG. 3 is a rear elevation view of the thermal imaging camera having a handle for crawling of FIG. 1;

FIG. 4 is a front elevation view of the thermal imaging camera having a handle for crawling of FIG. 1;

FIG. 6 is an isometric view of the thermal imaging camera having a handle for crawling of FIG. 1, showing the camera separated from its removable handle.

DETAILED DESCRIPTION OF THE INVENTION

The invention will be illustrated in more detail with reference to the following embodiments, but it should be understood that the present invention is not deemed to be limited thereto.

Figure 1:
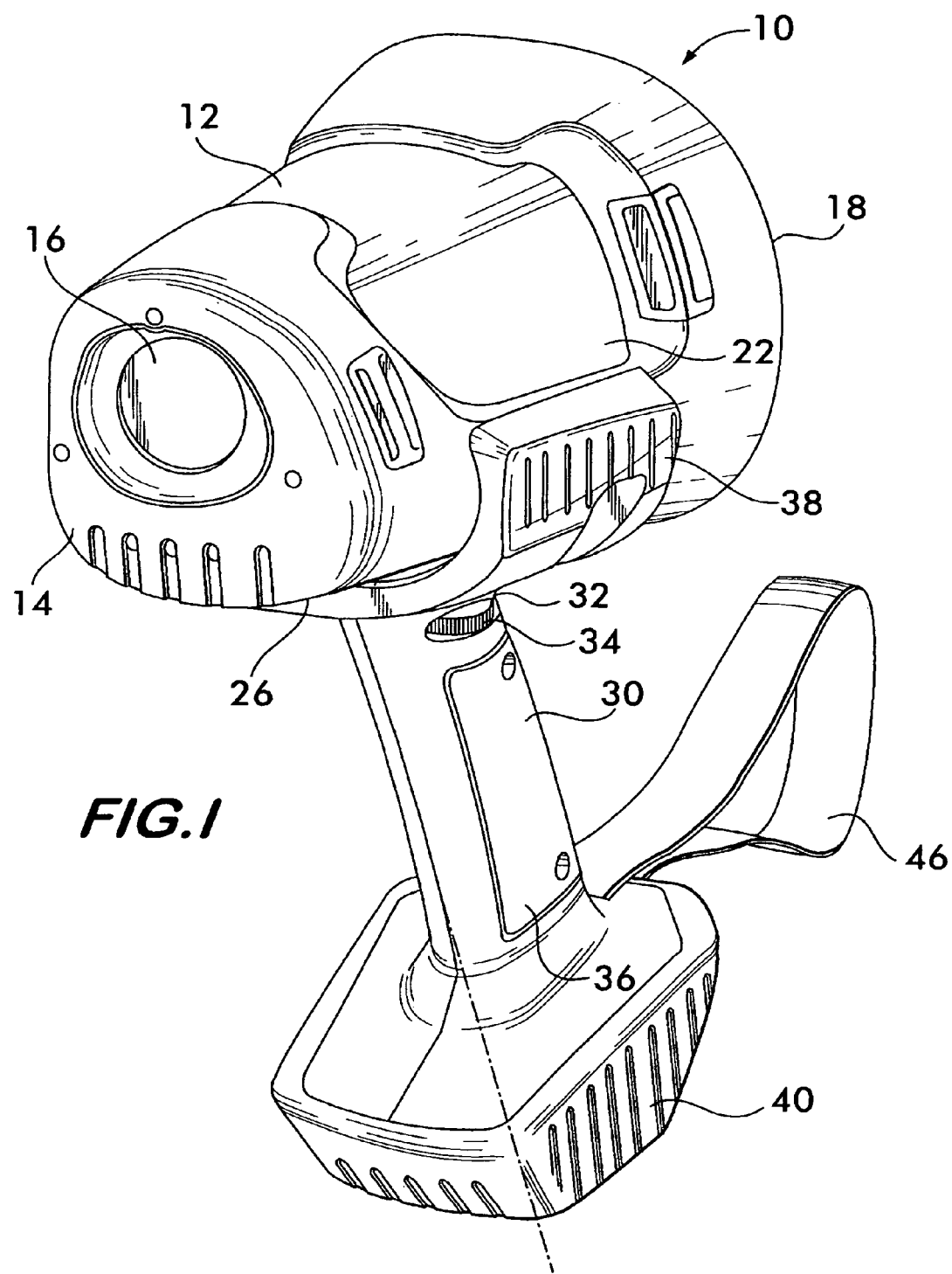
FIG. 1 is an isometric view of a thermal imaging camera having a handle for crawling, in accordance with a first preferred embodiment of the present invention.
Figure 2:
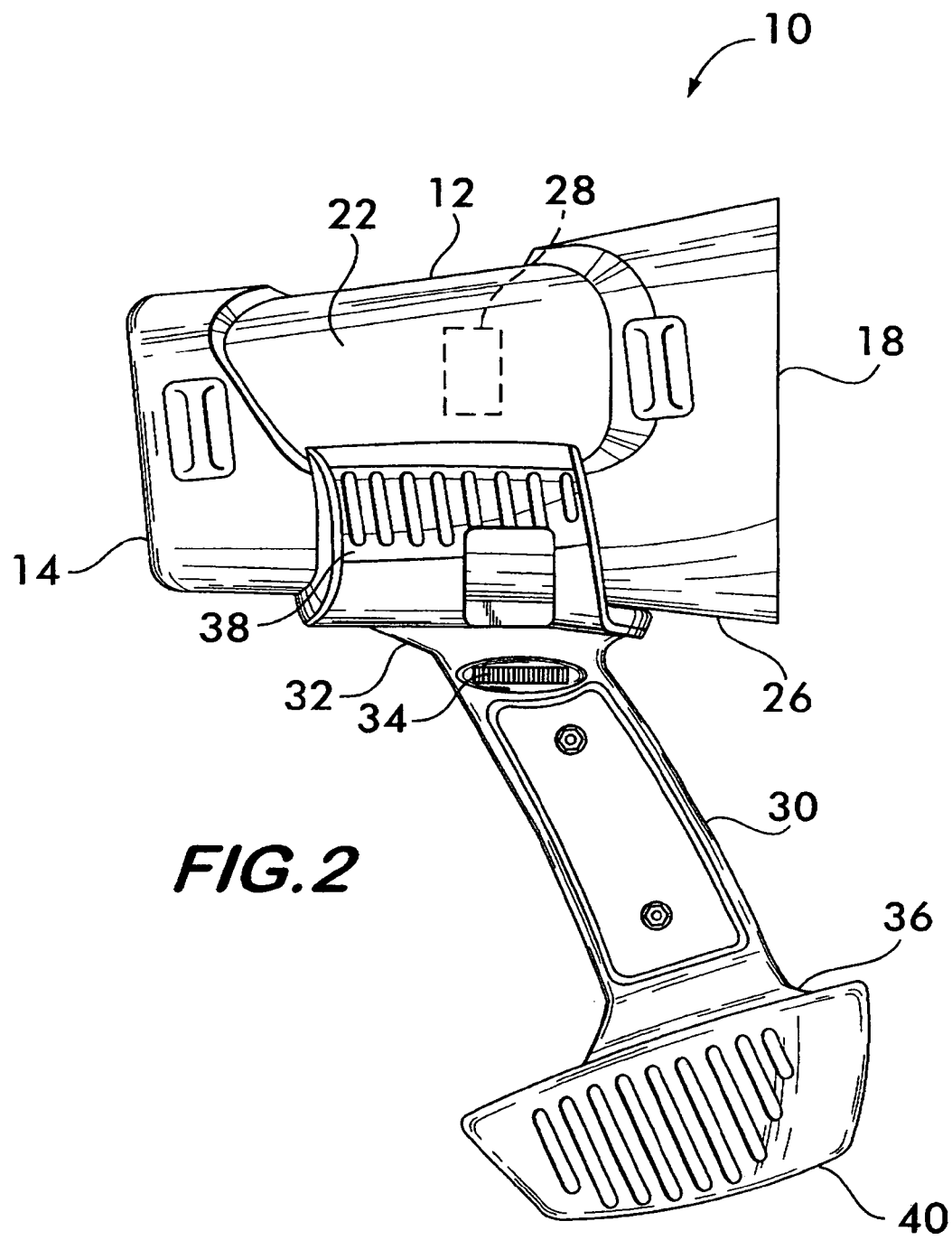
FIG. 2 is a side elevation view of the thermal imaging camera having a handle for crawling of FIG. 1.
Figure 5:
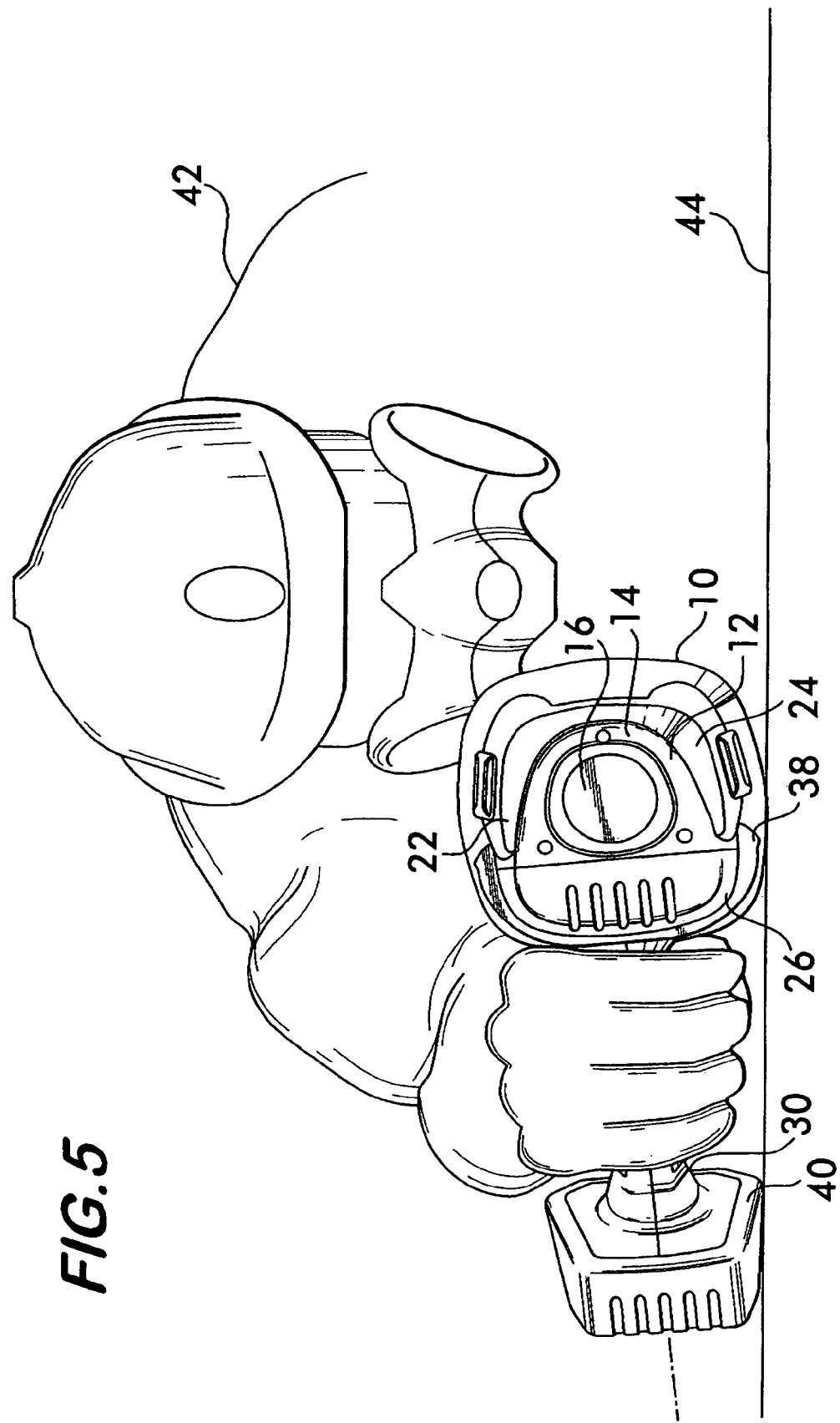
FIG. 5 is a front elevation view of the thermal imaging camera having a handle for crawling of FIG. 1, showing the camera in use by a firefighter.

Referring now to the drawings, wherein like part numbers refer to like elements throughout the several views, there is shown in FIGS. 1-6, a TIC 10 in accordance with a first preferred embodiment of the present invention. The TIC 10 includes a housing 12 having a front surface 14 having a lens 16, a rear surface 18 having a display 20, a pair of side surfaces 22, 24 between the front surface 14 and the rear surface 18, and a bottom surface 26. Internal to the TIC 10 is a grid having an array of heat sensors 28. The grid 28 is located within in the housing 12. As is typical in conventional TICs, the heat sensors each generate a signal that is proportional to the heat sensed. The lens 16 focuses infrared radiation on the grid 28. The display 20 is connected to the grid 28 and displays a real-time image of the heat sensed by each of the heat sensors on the grid 28 to form an image of the heat sensed by the grid 28.

A handle 30 extends from the bottom surface 26 of the housing 12. The handle 30 has a longitudinal axis X. The handle 30 has a first end 32 that is attached to the housing 12. Preferably, the handle 30 is removable (as shown in FIG. 6). For example, the handle 32 may be held on to the housing 12 with a ¼-20 thumb screw 34 that is attached to a ¼-20 threaded hole in the housing. That is, a tripod-type mount commonly found in commercial and professional film and digital cameras. Importantly, the first end 32 of the handle 30 has one or more bumpers 38. The first end of the handle 30 preferably wraps around the sides of the housing 12 and has integral side bumpers 38. The side bumpers 38 extend outwardly from the longitudinal axis of the handle 30 and provide substantial protection to the TIC, particularly in this configuration because the handle 30 (including its side bumpers 38) is independent of the TIC 10 and its housing 12.

The handle 30 also has a second end 36. The second end 36 of the handle 30 also has bumpers 40 integral to the handle. Importantly, as with the side bumpers 38, the bumpers 40 extend perpendicularly outwardly from the longitudinal axis X of the handle 30 to a point generally the same perpendicular distance from the longitudinal axis X as that of the side bumpers 38 on the first end 32 of the handle 30. Because both bumpers 38 and bumpers 40 extend about the same distance out from the longitudinal axis X of the handle 30 of the TIC 10, when a user hold the TIC 10 on its side, supported by the bumpers 38, 40, as is clearly shown in FIG. 5, the longitudinal axis is held comfortably on the ground when a user 42, such as firefighter, is using the TIC 10 while crawling, as is occasionally required. The TIC 10 may include bumpers 38, 40 as well as other bumpers located internal to and external to the TIC housing to protect the electronics of the TIC.

Use of the TIC 10 by a user 42 (such as a firefighter) who is crawling is facilitated by the display 20 which is positioned on the rear surface 18 of the housing 12 of the TIC 10. The display 20 is positioned such that when the user 42 is in a crawling position (see FIG. 5) with an arm extended which is holding the TIC, the user 42 has clear visibility of the display 20 such that the TIC 10 is particularly useful for the crawling user. The hand of the user 42 is supported off of a floor 44 upon which the user 42 is crawling and protects the TIC 10 from shock and vibration. The longitudinal axis A of the handle 30 remains parallel to the floor 44 such that the TIC is comfortably held for crawling whether the camera is held in the left or right hand with the display positioned to the left or the right side.

As discussed, preferably, the handle 30 is removable such that the TIC 10 may be used with or without the handle 30. Also, preferably, the handle 30 is held to the housing 12 of the TIC by a simple fastener such as a thumb screw (in the handle 30) attached to a threaded hole in the housing 12 of the TIC 10. Preferably, only the user's 42 fingers are will fasten and unfasten the handle 30. No separate tool or tools is required. Preferably, bumpers 38, 40 are attached to the handle 30. Since use of the handle is particularly useful for a user who is crawling, the additional protection of 38, 40 that are located on the handle 30 are particularly beneficial. When a user is not crawling, the shock and vibration resistance of the TIC is somewhat less. Without the handle 30 the dimensions of the TIC are substantially smaller, thereby offering the advantages of a smaller sized and more portable unit.

A strap may be attached to the handle 30, preferably, extending off the back of the handle 30 such that a user can have the strap 46 connected to his or her wrist while the TIC 10 is in a position for use.

While the invention has been described in detail and with reference to specific examples thereof, it will be apparent to one skilled in the art that various changes and modifications can be made therein without departing from the spirit and scope thereof.

What is claimed is:

1. A portable, thermal imaging camera, comprising:
   (a) a housing having a front surface having a lens, a rear surface having a display, a pair of side surfaces between the front surface and the rear surface, and a bottom surface;
   (b) a grid having an array of heat sensors, said grid located within in the housing, the heat sensors each generating a signal that is proportional to the heat sensed, wherein the lens focuses infrared radiation on the grid;
   (c) the display connected to the grid, for displaying a real-time image of the heat sensed by each of the heat sensors on the grid to form an image of the heat sensed by the grid;
   (d) a handle extending from the bottom surface of the housing, comprising:
      (i) a longitudinal axis;
      (ii) a first end attached to the housing, said first end having at least one bumper extending perpendicularly outwardly from the longitudinal axis of the handle to a point beyond the side surface of the housing,
      (iii) a second end having at least one bumper thereon, extending perpendicularly outwardly from the longitudinal axis of the handle to a point generally the same perpendicular distance from the longitudinal axis as that of the bumper on the first end of the handle;

whereby, crawling by a user holding the camera by its handle using a hand is facilitated where the user's hand is supported off of a floor upon which the user is crawling and protects the TIC from shock and vibration.

2. The thermal imaging camera of claim 1, wherein the handle is removable.

3. The thermal imaging camera of claim 2, wherein the removable handle attaches to the housing by a fastener that is operable without the use of a separate tool.

4. The thermal imaging camera of claim 3, wherein the fastener is a screw having a head that is manually operable by fingers of a user.

5. A removable handle for a portable, thermal imaging camera, comprising:
 (a) a longitudinal axis;
 (b) a first end having a fastener for attachment to the thermal imaging camera, said first end having at least one bumper extending perpendicularly outwardly from the longitudinal axis of the handle to a point beyond the side surface of the thermal imaging camera;
 (c) a second end having at least one bumper thereon, extending perpendicularly outwardly from the longitudinal axis of the handle to a point generally the same perpendicular distance from the longitudinal axis as that of the bumper on the first end of the handle;

whereby, when the handle is attached to a thermal imaging camera, crawling by a user holding the camera by its handle using a hand is facilitated where the user's hand is supported off of a floor upon which the user is crawling and protects the TIC from shock and vibration.

6. The handle of claim 5, wherein the fastener is operable without the use of a separate tool.

7. The thermal imaging camera of claim 5, wherein the fastener is a thumb screw having a head that is manually operable by fingers of a user.

* * * * *